Nov. 27, 1956   LE ROY A. GRIFFITH   2,772,049
FUEL DURATION COMPUTER
Filed Feb. 9, 1951
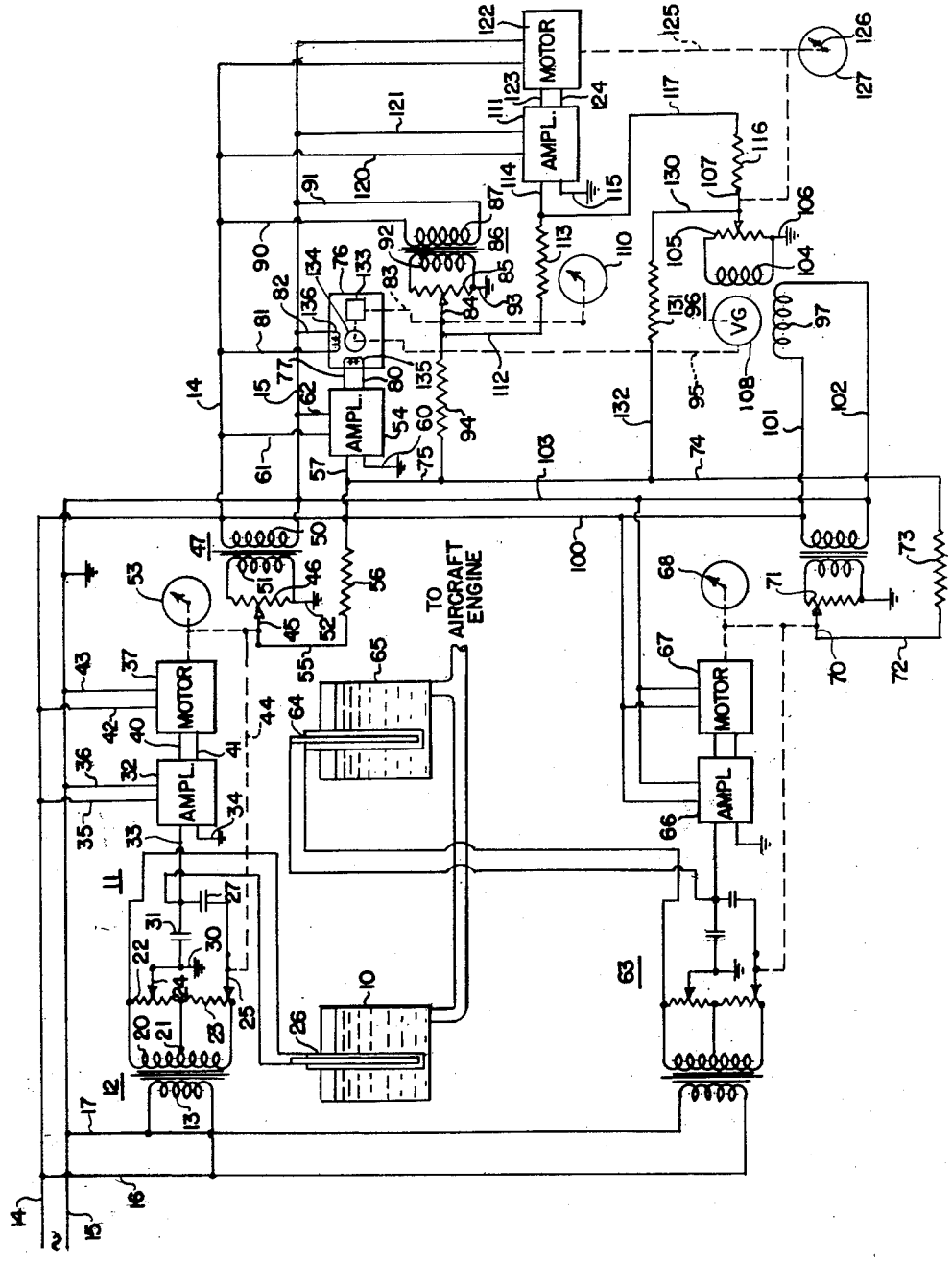
Inventor
LEROY A. GRIFFITH
By George H. Fisher
Attorney United States Patent Office 2,772,049
Patented Nov. 27, 1956

2,772,049

FUEL DURATION COMPUTER

Le Roy A. Griffith, Minneapolis, Minn., assignor to Minneapolis-Honeywell Regulator Company, Minneapolis, Minn., a corporation of Delaware Application February 9, 1951, Serial No. 210,258

9 Claims. (Cl. 235—61)

This invention is concerned with a fuel duration computer and particularly with a computer for use with aircraft.

In present day aircraft fuel quantity indicators are almost universally used. Fuel quantity indicators in themselves, however, are not enough to enable the pilot, flight engineer, or other personnel to know immediately whether or not the craft can reach its destination, but further calculations must be made to determine how much additional flying time the fuel will permit.

In a copending application of Kimball C. Cummings, Serial Number 153,421, filed April 1, 1950, Patent No. 2,656,977, and assigned to the same assignee as the present invention, a fuel duration computer is also shown and claimed. In that application, a fuel quantity signal voltage is derived from various networks, each having as one arm thereof a tank unit having a capacitance which varies according to the quantity of fuel in a tank. The rate at which the fuel is used is measured by flow meters which measure only the fuel flowing to the engines to derive a voltage indicative of the rate of consumption of fuel by the engines. A portion of the voltage indicative of the rate of fuel flow is compared with the voltage indicative of the quantity of fuel remaining in the tanks to cause operation of a motor which controls the portion of the rate of fuel voltage compared. The motor also moves a pointer along a dial to give a visual indication of the time of duration of the fuel.

The manner of obtaining a rate of fuel flow by using flow meters to measure only the amount of fuel consumed by the engines is disadvantageous because it does not take into account the loss of fuel by evaporation, leakage or the like.

It is therefore an object of the present invention to design a new and improved fuel duration computer.

Another object of the invention is to design a highly accurate computer which is simple and uses a minimum of components.

Another object of the invention is to design a fuel duration computer which takes into consideration every manner in which the fuel leaves the fuel tanks.

A further object of the invention is to design such a computer as derives the rate of fuel flow signal from the change in the fuel quantity signal as the quantity of fuel changes.

The present invention is similar to that of the copending Cummings application in obtaining the fuel quantity signal voltage but differs from that of the copending application in the method of obtaining the rate signal. In the present invention the motor which is controlled by the fuel quantity signal is operated only upon a change in the fuel quantity signal with the speed of operation dependent upon the rate of change of the fuel quantity signal. A velocity generator may thus be connected to the motor to derive an output voltage dependent in magnitude upon the total rate of change of the quantity of fuel in the tanks. The velocity generator serves a second function in providing a stabilizing feedback signal and so prevents hunting. As in the copending application, a portion of the rate voltage is compared with the fuel quantity voltage to cause operation of a further motor which controls the portion of the rate voltage which is compared.

For a better understanding of the invention reference is had to the following detailed description taken in conjunction with the accompanying drawing in which:

The single figure is a diagrammatic sketch showing one form of the invention.

In the circuit two fuel tanks are shown, although of course it is understood that only one or more than two could be used if desired. The fuel quantity signal for tank 10 is derived from a network 11 which obtains its power voltage through a transformer 12 having a primary 13 connected to a pair of power leads 14 and 15 by means of conductors 16 and 17. Transformer 12 also has a secondary 20 which has a center tap 21.

The network 11 may be the same as shown and described in a Schafer et al. Patent 2,635,280 assigned to the same assignee as the present invention. For purposes of simplicity, it is shown in somewhat simplified form.

As shown, two arms of the network 11 are comprised of potentiometers 22 and 23. The upper terminal of potentiometer 22 is connected to the upper terminal of transformer secondary 20 while the lower terminal of potentiometer 23 is connected to the lower terminal of transformer secondary 20. The lower terminal of potentiometer 22 is connected to the upper terminal of potentiometer 23 and this junction is connected to center tap 21 of transformer secondary 20.

Potentiometer 22 has a wiper arm 24, connected to ground terminal 30, cooperating therewith while potentiometer 23 has a wiper arm 25 moved therealong.

The other two arms of the network 11 are composed of capacitors 26 and 27. Capacitor 26 is placed in tank 10 and the capacitance of this capacitor varies with the amount of fuel in the tank. One of the plates of capacitor 26 is connected to the upper terminal of secondary 20 while the other plate is connected to one of the plates of capacitor 27. The other plate of capacitor 27 is connected to wiper arm 25. The junction between capacitors 26 and 27 is connected to ground terminal 30 through capacitor 31. The output voltage of the network is taken from across capacitor 31.

Wiper arm 24 is for the purpose of calibrating the network 11 so that there is no voltage output when there is no fuel in the tank 10. This may be accomplished by using a capacitor for capacitor 27 which has the same capacitance value as capacitor 26 when there is no fuel in tank 10. Then with wiper arm 25 preferably set near the upper end of potentiometer 23, wiper arm 24 is manually adjusted until there is no voltage drop across capacitor 31. This would occur when the value of the resistance between the upper terminal of potentiometer 22 and wiper arm 24 is the same as the resistance value of the portion of the potentiometers 22 and 23 between wiper arms 24 and 25.

Wiper arm 25 is for reblancing purposes and is operated upon to rebalance the network 11 upon a change in capacitance of capacitor 26. Thus, when the tank 10 is full the capacitance of capacitor 26 is approximately twice its capacitance value when the tank is empty, because the dielectric constant of the fuel is approximately twice that of air, and wiper arm 25 is moved downward along potentiometer 23 to hold the ratio of the capacitance values of capacitor 26 to capacitor 27 equal to the ratio of the resistances of the portion of potentiometer 22 above wiper arm 24 to the portion of the resistance between wiper arms 24 and 25. When this relationship is true there is no voltage across capacitor 31 and thus no output voltage from the network.

The output voltage of network 11 is fed into an amplifier 32 with the junction between capacitors 26 and 27 connected to the amplifier by means of a conductor 33. The other terminal of the input circuit of amplifier 32 is connected to ground terminal 34. Amplifier 32 is energized from power leads 14 and 15 by conductors 35 and 36. The amplifier controls the operation of a motor 37 through conductors 40 and 41. Motor 37 is connected across power leads 14 and 15 by means of conductors 42 and 43. The amplifier and motor combination could be that shown and described in the Upton Patent 2,423,534, issued July 8, 1947.

Motor 37 has mechanical output 44 connected to wiper arm 25 in a rebalancing circuit arrangement to rebalance the network 11 and reduce the output voltage from the network to zero. The mechanical output 44 is also connected to a wiper arm 45 moving along a potentiometer 46. Potentiometer 46 is energized by a transformer 47 having a primary 50 connected to power leads 14 and 15. Transformer 47 also has a secondary 51 across which the potentiometer 46 is connected. The lower terminal of potentiometer 46 is connected to ground terminal 52. The output voltage of potentiometer 46 is thus an indication of the quantity of fuel in tank 10.

Mechanical connection 44 may also move a pointer along an indicator dial 53 to indicate the quantity of fuel in tank 10.

Because of the circuit for rebalancing network 11 it is obvious that there is no output voltage from network 11 except when the quantity of fuel in tank 10 is changing. Also it should be apparent that the magnitude of the output voltage from network 11 is dependent upon the rate at which the quantity of fuel in tank 10 changes. This is true because the rebalancing action of motor 37 necessarily lags by a constant time interval the unbalancing of the network 11 due to change in capacitance of tank unit 26 upon change in the quantity of fuel in tank 10. The magnitude of the change in capacitance of tank unit 26 during that time interval then determines the magnitude of the output of the network 11. It is of course, understood that the signal voltage from network 11 must be within the saturation characteristics of the rebalancing circuit and that the motor R. P. M. changes linearly with linear change in signal. Thus it is seen that the energization of amplifier 32 and the speed of operation of motor 37 is dependent upon the rate of change of the quantity of fuel in the tank.

The output voltage of potentiometer 46 is connected to the input circuit of amplifier 54 through conductor 55, summing resistor 56 and conductor 57 to amplifier 54. The other terminal of the input circuit of amplifier 54 is connected to the ground terminal 60. The amplifier is connected to power leads 14 and 15 by conductors 61 and 62.

A second network 63 is connected to a capacitor 64 in fuel tank 65 to derive a signal therefrom. The output voltage of network 63 is impressed upon the input circuit of an amplifier 66 which controls the operation of a motor 67. The motor 67 operates to rebalance the network 63, give a visual indication of the quantity of fuel in tank 65 by operating the pointer of indicator 68, and move a wiper arm 70 along a potentiometer 71. As this apparatus comprising network 63, amplifier 66 and motor 67, along with potentiometer 71, is identical to the apparatus of network 11, amplifier 32, motor 37 and potentiometer 46, which has been previously described, a detailed discussion of the description and operation of network 63, amplifier 66, motor 67 and potentiometer 71 is not deemed necessary.

The output voltage of potentiometer 71 is also impressed upon the input circuit of amplifier 54 through conductor 72, summing resistor 73, and conductors 74, 75, and 57. It can be seen that the two fuel quantity signal voltages are added together to control the energization of amplifier 54.

Amplifier 54 is connected to winding 135 of a motor 76, considered as comprising a rotor, two field windings cooperating with the rotor, and a gear train driven by the rotor, to control the operation thereof through conductors 77 and 80. Power winding 136 of motor 76 is connected to power leads 14 and 15 by conductors 81 and 82. Motor 76 has a mechanical output 83 which operates through a step down gear train 133 to control the movement of a wiper arm 84 along a potentiometer 85.

Potentiometer 85 is energized from a transformer 86 having a primary 87 connected to power leads 14 and 15 through conductors 90 and 91. Transformer 86 also has a secondary 92 to which potentiometer 85 is connected. The lower terminal of potentiometer 85 is shown to be connected to ground terminal 93.

The output voltage of potentiometer 85 is fed back to the input circuit of amplifier 54 through summing resistor 94 and conductors 75 and 57 to balance out the voltages from potentiometers 46 and 71. Thus there is no voltage input to amplifier 54 when the total quantity of fuel does not change. When the total quantity of fuel changes there is a voltage input into the amplifier which is dependent in magnitude upon the rate of change of the quantity of fuel in the tanks 10 and 65. Thus, the energization of amplifier 54 and speed of operation of motor 76 is dependent upon the rate of change of the quantity of fuel in the fuel tanks.

The rotor 134 of motor 76 is connected through a mechanical output 95 to a velocity induction generator 96.

Velocity generator 96 has a primary winding 97 connected to power leads 14 and 15 by the following circuit; from power lead 14 through conductors 100 and 101, winding 97, and conductors 102 and 103 to power lead 15. The velocity generator 96 has a secondary winding 104 normally in non-inductive relation with winding 97. The velocity generator is provided with an induction rotor 108 which acts to induce a voltage in winding 104 from winding 97, the magnitude of the induced voltage being dependent upon the speed of rotation of rotor 108 which is coupled to rotor 134. A typical device of this type is that shown in Riggs Patent 2,115,086.

A potentiometer 105 is connected across secondary winding 104 of the velocity generator and may be known as the rate potentiometer. The bottom terminal of the potentiometer is connected to a ground terminal 106. A wiper arm 107 cooperates with potentiometer 105. The wiper arm 107 is connected to the input circuit of amplifier 54 through conductor 130, current limiting resistor 131 and conductors 132, 74, 75 and 57 to impress a stabilizing feedback voltage into the amplifier 54 for antihunt purposes.

A mechanical connection 83 of motor 76 may drive a pointer along a dial 110 to give an indication of the total quantity of fuel in the tank. It is understood, of course, that the mechanical outputs of the various motors to the wiper arms moving along the potentiometer and the pointers of the dials are through step down gear trains considered here as being parts of the motor. The velocity generator 96 is either connected directly to the rotor of motor 76 or through a step up gear train so as to be capable of inducing a sufficiently high voltage in winding 104.

The output voltage of potentiometer 85 is impressed upon the input circuit of an amplifier 111 through conductor 112, summing resistor 113 and conductor 114. The other terminal of the input circuit of the amplifier is connected to a ground terminal 115.

A portion of the voltage across potentiometer 105, which is an indication of the rate of change of the quantity of fuel in the tanks, is impressed on the input circuit of amplifier 111 through wiper arm 107, summing resistor 116 and conductors 117 and 114 where it is compared with the total fuel quantity voltage with the difference in potential between the two voltages controlling the energization of the amplifier. Amplifier 111 is connected to power leads 14 and 15 through conductors 120 and 121.

Amplifier 111 controls the operation of a motor 122 to which it is connected by means of conductors 123 and 124. Motor 122 is shown to be directly connected to power leads 14 and 15. The motor has a mechanical output 125 which is connected to the wiper arm 107 cooperating with rate potentiometer 105. Thus, operation of motor 122 controls the amount of voltage picked off from potentiometer 105 which is compared with the fuel quantity voltage and may be considered the time indication. It is seen that when the two voltages impressed on the input circuit of amplifier 111 are equal the equation $$Q = \frac{dc}{dt} \times T$$

is satisfied, where Q represents a voltage indicative of the total quantity of fuel in the tank, $$\frac{dq}{dt}$$

represents a voltage indicative of the rate of change of the quantity of fuel in the tank, and T represents the time which the fuel will last if it continues to be consumed at the present rate. Thus since the relative position of slider 107 determines the portion of the voltage proportional to $$\frac{dq}{dt}$$

which is necessary to make it equal to the voltage indicative of fuel quantity, or Q it is obvious that the slider position, and hence the position of motor 122, is proportional to T.

Motor 122 may also be connected to a pointer 126 on a dial 127 to give a visual indication of the length of time the fuel will last.

It is thus seen that a computer has been designed in which the rate of change of fuel in the tank takes into account all methods by which fuel might leave the tank in that the rate of change of the fuel is directly dependent at all times upon the exact quantity of the fuel.

Because modifications may be readily apparent to those skilled in the art it is intended that the spirit of this invention be limited only to the extent of the appended claims.

I claim as my invention:

1. Apparatus for determining the length of time a substance will last, comprising, in combination: first means, including first motor means, deriving a first voltage dependent in magnitude upon the quantity of a substance; voltage generating means, connected to said first motor means and operated by said first motor means, deriving a second voltage dependent in magnitude upon the rate of change of the quantity of the substance; voltage comparing means, including second motor means, connected to said first means and said voltage generating means and comparing the first voltage with a portion of the second voltage to control the operation of said second motor means; and means connecting said second motor means to said voltage generating means to control the compared portion of the second voltage, the compared portion being an indication of the length of time the substance would last if the quantity of the substance were to continue to change at the present rate.

2. Fuel duration indicator apparatus for determining the length of time fuel in a tank would last if the quantity of fuel were to continue to change at its present rate by solving the equation $$Q = \frac{dq}{dt} T$$

wherein Q represents the quantity of fuel in the tank, $$\frac{dq}{dt}$$

represents the rate of change of the quantity of fuel in the tank, and T represents the length of time the fuel would last if the quantity of fuel in the tank were to continue to change at the present rate, comprising: means, including first motor means, deriving a first voltage representing Q; means operated by said first motor means deriving a second voltage representing $$\frac{dq}{dt}$$

means, including second motor means, comparing the first voltage with a portion of the second voltage to control the operation of said second motor means to adjust the compared portion of the second voltage to cause it to equal the first voltage, the compared portion of the second voltage then representing the term $$\frac{dq}{dt} T$$

and satisfying the equation; and indicating means operated by said second motor means in accordance with the extent of adjusting of said compared portion to indicate the value of T which satisfies the equation.

3. Fuel duration indicator apparatus for determining the length of time fuel in a tank would last if the quantity of fuel were to continue to change at its present rate by solving the equation $$Q = \frac{dq}{dt} T$$

wherein Q represents the quantity of fuel in the tank, $$\frac{dq}{dt}$$

represents the rate of change of the quantity of fuel in the tank, and T represents the length of time the fuel would last if the quantity of fuel in the tank were to continue to change at the present rate, comprising; means, including first motor means, deriving a first voltage representing Q; a velocity generator operated by said first motor means deriving a second voltage representing $$\frac{dq}{dt}$$

means, including second motor means, comparing the first voltage with a portion of the second voltage to control the operation of said second motor means to adjust the compared portion of the second voltage to cause it to equal the first voltage, the compared portion of the second voltage then representing the term $$\frac{dq}{dt} T$$

and satisfying the equation; and indicating means operated by said second motor means in accordance with the extent of adjusting of said compared portion to indicate the value of T which satisfies the equation.

4. Fuel duration indicator apparatus comprising, in combination: normally balanced network means having as one arm thereof a sensing element, the signal from which varies with the quantity of fuel in a tank; first motor means; means connecting said first motor means to said network means to cause operation of said first motor means upon unbalance of said network means, the speed of operation of said first motor means being a function of the extent of unbalance of said network means and thus of the rate of change of the quantity of fuel in the tank; a first potentiometer; means connecting said first potentiometer to said first motor means to vary the output voltage of said potentiometer upon operation of said first motor means, the output voltage of said first potentiometer being a function of the quantity of fuel in the tank; a velocity generator; means connecting said velocity generator to said first motor means to cause operation of said velocity generator upon operation of said first motor means, the output voltage of said velocity generator being a function of the rate of change of the quantity of fuel in the tank; a second potentiometer having a wiper arm; means impressing the output voltage of said velocity generator across said second potentiometer; signal amplification means having an input circuit; means impressing the output voltages of said first and second potentiometers on the input circuit of said signal amplification means to cause energization of said signal amplification means upon the output voltages of said first and second potentiometers differing from each other; second motor means; means connecting said second motor means to said signal amplification means to cause operation of said second motor means upon energization of said signal amplification means; means connecting said second motor means to the wiper arm on said second potentiometer to cause movement of the wiper arm upon operation of said second motor means to vary the output voltage from said second potentiometer until it is equal to the output voltage from said first potentiometer; and indicating means connected to said second motor means and operated by said second motor means to give an indication of the length of time the fuel would last if it were to continue to leave the tank at the present rate.

5. Fuel duration indicator apparatus comprising, in combination: a plurality of normally balanced network means, each having as one arm thereof a sensing element, the signal from which varies with the quantity of fuel in a tank; a first plurality of motor means connected to said plurality of network means to control the operation of the various motor means by the associated network means; a first plurality of potentiometers connected to said plurality of motor means to vary the output voltage of the various potentiometers upon operation of the associated motor means, the output voltages of said first plurality of potentiometers being functions of the quantities of fuel in the tanks; second motor means; means, connected to said second motor means, summing the output voltages of said first plurality of potentiometers to control the operation of said second motor means; a second potentiometer having its wiper arm connected to said second motor means, the output voltage of said second potentiometer being a function of the total quantity of fuel in the tanks; a velocity generator connected to said second motor means to cause operation of said velocity generator upon operation of said second motor means, the output voltage of said velocity generator being a function of the rate of change of the total quantity of fuel in the tanks; a third potentiometer having the output voltage of said velocity generator impressed thereacross; third motor means; means, connected to said third motor means, comparing the output voltages of said second and said third potentiometers to control the operation of said third motor means; means connecting the wiper arm on said third potentiometer to said third motor means to vary the output voltage of said third potentiometer upon operation of said third motor means until the output voltage of said third potentiometer is equal to the output voltage of said second potentiometer; and indicating means connected to said third motor means and operated by said third motor means to give an indication of the length of time the total quantity of fuel would last if it were to continue to leave the tanks at the present rate.

6. Apparatus for comparing the quantity of a substance in a container with the rate of change of the quantity of the substance in the container comprising, in combination: measuring means, comprising motor means, operated in accordance with the quantity of the substance in the container; first means connected to said motor means deriving a first voltage dependent in magnitude upon the quantity of the substance in the container; second means connected to and controlled by said motor means deriving a second voltage dependent in magnitude upon the rate of change of the quantity of the substance in the container; and voltage comparing means connected to said first and said second means and comparing said first and second voltages to provide an indication of the length of time the substance would last if the quantity of the substance in the container were to continue to change at the present rate.

7. Apparatus for comparing the quantity of a substance in a container with the rate of change of the quantity of the substance in the container comprising, in combination: measuring means comprising a sensing element to be inserted into the container for deriving a signal indicative of the quantity of the substance in the container, said measuring means further comprising motor means; first means conected to said motor means deriving a first voltage dependent in magnitude upon the quantity of the substance in the container; second means connected to and controlled by said motor means deriving a second voltage dependent in magnitude upon the rate of change of the quantity of the substance in the container; and voltage comparing means connected to said first and said second means and comparing said first and second voltages to provide an indication of the length of time the substance would last if the quantity of the substance in the container were to continue to change at the present rate.

8. Apparatus for determining the length of time fluid in a container which is being drained will last, comprising in combination: a rebalancing network comprising a sensing element in the container producing a signal indicative of the quantity of fluid in the container and further comprising first motor means operative upon unbalance of the network; voltage controlling means connected to said first motor means deriving a voltage indicative of the quantity of fluid in the container; a velocity generator connected to said first motor means for operating the velocity generator such that the output voltage generated by said velocity generator is a function of the rate of change of the quantity of fluid in the container; comparing means connected to said voltage controlling means and said velocity generator output circuit and comparing the voltage from said voltage controlling means with a portion of the voltage from said velocity generator output circuit; second motor means connected to said comparing means for controlling the operation of said second motor means; and means connecting said second motor means to the velocity generator output circuit to control the compared portion of output voltage generated by said velocity generator, the compared portion being an indication of the length of time the fluid would last if it continues to drain from the container at its present rate.

9. Apparatus for determining the length of time fluid in a container which is being drained will last, comprising in combination: a rebalancing network comprising a sensing element in the container producing a signal indicative of the quantity of fluid in the container and further comprising first motor means operative upon unbalance of the network; voltage controlling means connected to said first motor means deriving a voltage indicative of the quantity of fluid in the container; a velocity generator connected to said first motor means for operating the velocity generator such that the output voltage generated by said velocity generator is a function of the rate of change of the quantity of fluid in the container; comparing means connected to said voltage controlling means and said velocity generator output circuit and comparing the voltage from said voltage controlling means with a portion of the voltage from said velocity generator output circuit; second motor means connected to said comparing means for controlling the operation of said second motor means; means connecting said second motor means to the velocity generator output circuit to control the compared portion of output voltage generated by said velocity generator, the compared portion being an indication of the length of time the fluid would last if it continues to drain from the container at its present rate; and feedback means inpressing a voltage generated by said velocity generator in said first motor means to be compared with the voltage from said rebalancing network to said first motor means and stabilize the operation of said first motor means.

References Cited in the file of this patent

UNITED STATES PATENTS

| | | |
|---|---|---|
| 2,188,628 | Freystedt | Jan. 30, 1940 |
| 2,385,454 | Lehde | Sept. 25, 1945 |
| 2,414,430 | Nisbet | Jan. 14, 1947 |
| 2,421,560 | Haynes | June 3, 1947 |
| 2,425,317 | Harris | Aug. 12, 1947 |
| 2,442,792 | White et al. | June 8, 1948 |
| 2,454,520 | Moore | Nov. 23, 1948 |
| 2,476,747 | Lovell | July 19, 1949 |
| 2,497,216 | Greenaugh | Feb. 14, 1950 |
| 2,567,532 | Stephenson | Sept. 11, 1951 |
| 2,656,977 | Cummings | Oct. 27, 1953 |

OTHER REFERENCES

"Electronics," Electric Computers by Wm. Shannon, pages 110–113, August 1946.